United States Patent Office 2,976,290
Patented Mar. 21, 1961

2,976,290

PIPERAZINE DERIVATIVES AND METHODS FOR THEIR PRODUCTION

Robert F. Parcell, St. Clair Shores, Mich., assignor to Parke, Davis & Company, Detroit, Mich., a corporation of Michigan No Drawing. Filed Apr. 24, 1959, Ser. No. 808,551

3 Claims. (Cl. 260—268)

This invention relates to novel piperazine derivatives and to methods for obtaining the same. More particularly, it relates to the free base, 1-(m-methylthiophenyl)-piperazine, to acid-addition salts thereof, and to methods for their production.

In accordance with the invention, the aforementioned free base and its acid-addition salts can be prepared by reacting m-(methylthio)aniline with a bis-($\beta$-haloethyl)-amine or with an acid-addition salt thereof, followed by isolation of the desired product as the free base or as an acid-addition salt. The process is carried out by reacting m-(methylthio)aniline with a bis($\beta$-halo-ethyl)-amine, optionally in the presence of an acid-binding agent such as triethylamine, pyridine, or another suitable organic or inorganic base, or by reacting m-(methylthio)-aniline with an acid-addition salt of a bis($\beta$-haloethyl)-amine, optionally in the presence of an acid-binding agent. Although the reaction can be carried out without a solvent or with an excess of one of the reagents as a solvent, best results are obtained by employing an additional, unreactive solvent or suspending agent such as toluene, xylene or chlorobenzene. The reaction is carried out at elevated temperatures, suitably within the range of about 50 to 200° C., or at the reflux temperature of the solvent.

In a preferred method for carrying out the process of the invention, 2 moles of m-(methylthio)aniline is heated with 1 mole of an acid-addition salt of bis-($\beta$-bromo-ethyl)amine in chlorobenzene. After the initial exothermic reaction subsides, the condensation is completed by adding 1 mole of an acid-binding agent such as triethyl-amine and heating the mixture under reflux. The desired 1-(m-methylthiophenyl)piperazine is isolated as the free base after removing the volatile components of the mixture and rendering it basic.

1-(m-methylthiophenyl)piperazine forms acid-addition salts with a variety of inorganic and organic acids. Non-toxic salts are formed by interaction of one or both of the basic nitrogen atoms with such acids as hydrochloric, hydrobromic, hydriodic, sulfuric, acetic, benzoic, citric, maleic, malic, gluconic, ascorbic and related acids. Such salts are produced by reaction of the free base, suitably in an unreactive solvent, with the selected acid.

1-(m-methylthiophenyl)piperazine and its non-toxic acid-addition salts have valuable pharmacological properties. They are potent hypotensive agents, being more active in this respect than compounds of related chemical structure. Moreover, they have useful effects upon the central nervous system and produce cerebral depression of value in the management of anxiety and hyperexcitability. 1-(m-methylthiophenyl)piperazine and its acid-addition salts are chemical intermediates useful in the production of other piperazine derivatives having central nervous system activity and other useful pharmacological properties.

The invention is illustrated, but not limited, by the following example:

*Example*

A stirred slurry of 349 g. of m-(methylthio)aniline and 393 g. of bis($\beta$-bromoethyl)amine hydrobromide in 600 ml. of chlorobenzene is heated under a reflux condenser to 95° C. An exothermic reaction takes place as the temperature continues to rise to about 130° C. When the temperature begins to fall, 127 g. of triethylamine is rapidly added, and stirring and heating under reflux are continued for an additional 5 hours. The chlorobenzene is removed by distillation with steam, and the remaining mixture is made strongly basic with excess sodium hydroxide and extracted with ether. The ethereal extract is washed with water, rendered anhydrous and evaporated. The residue is fractionally distilled under reduced pressure. After a forerun of recovered m-(methylthio)aniline, the desired 1-(m-methylthiophenyl)piperazine is collected as a fraction boiling at about 135–138° C. at 0.15 mm. This compound has the structural formula

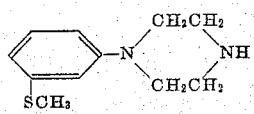

In the foregoing procedure, the same 1-(m-methylthiophenyl)piperazine is obtained by substituting 337 g. of bis($\beta$-bromoethyl)amine hydrochloride or 225 g. of bis-($\beta$-chloroethyl)amine hydrochloride for the bis($\beta$-bromo-ethyl)-amine hydrobromide. The corresponding free amines can also be employed.

A monohydrochloride is obtained by treating an ethereal solution of the free base 1-(m-methylthiophenyl)-piperazine with approximately one equivalent of hydrogen chloride in isopropyl alcohol. After recrystallization from a mixture of isopropyl alcohol and ether, this salt melts at about 188–189° C. It is readily soluble in water.

A water-soluble dihydrochloride is obtained by treating a solution of the free base in a small quantity of isopropyl alcohol with approximately two equivalents of hydrogen chloride in isopropyl alcohol, followed by precipitating the desired salt with a large volume of ether.

A water-soluble monohydrobromide is obtained by treating an ethereal solution of the free base with approximately one equivalent of hydrogen bromide in isopropyl alcohol.

A water-soluble citrate is obtained by mixing a solution of the free base in methanol with a solution of citric acid in methanol and concentrating the mixture to a small volume.

I claim:

1. A member of the class consisting of 1-(m-methylthiophenyl)piperazine and non-toxic acid-addition salts thereof.
2. 1-(m-methylthiophenyl)piperazine.
3. 1-(m-methylthiophenyl)piperazine monohydrochloride.

References Cited in the file of this patent

UNITED STATES PATENTS

| | | |
|---|---|---|
| 2,636,032 | Weston et al. | Apr. 21, 1953 |
| 2,836,594 | Parcell | May 27, 1958 |

FOREIGN PATENTS

| | | |
|---|---|---|
| 793,899 | Great Britain | Apr. 23, 1958 |